United States Patent [19]

Korpela et al.

[11] Patent Number: 4,897,472

[45] Date of Patent: Jan. 30, 1990

[54] PROCESS FOR ISOLATION AND PURIFICATION OF CYCLODEXTRINS

[75] Inventors: Timo Korpela; Simo Laakso; Mauri Mäkelä, all of Turku, Finland

[73] Assignee: Oy Alko Ab, Norway

[21] Appl. No.: 195,460

[22] Filed: May 12, 1988

Related U.S. Application Data

[63] Continuation of Ser. No. 932,721, Nov. 19, 1986, abandoned.

[51] Int. Cl.$^4$ .............................................. C08B 30/18
[52] U.S. Cl. ...................................... 536/46; 536/103; 536/112
[58] Field of Search ........................ 1/46; 536/103, 112

[56] References Cited

U.S. PATENT DOCUMENTS

| | | | |
|---|---|---|---|
| 3,420,788 | 1/1969 | Solms | 536/103 |
| 3,459,732 | 8/1969 | Hull et al. | 536/46 |
| 4,357,468 | 11/1982 | Szejtli et al. | 536/103 |
| 4,365,061 | 12/1982 | Szejtli et al. | 536/103 |
| 4,418,144 | 11/1983 | Okada et al. | 536/103 |

Primary Examiner—Joseph L. Schofer
Assistant Examiner—Peter D. Mulcahy
Attorney, Agent, or Firm—Andrus, Sceales, Starke & Sawall

[57] ABSTRACT

This invention provides a simple and efficient technique for isolating and purifying alpha-, beta- and especially gamma-cyclodextrins, and also their chemical derivatives. The isolation of different cyclodextrin subforms is based on the use of specially designed macromolecular adsorbents. These adsorbents contain covalently bound ligands which are of suitable size to penetrate the internal cavity of the cyclodextrin molecules and form specific inclusion complexes with cyclodextrins. By means of this invention it is also possible to increase the proportion of any of the cyclodextrin subforms or its chemical derivative by removing the corresponding cyclodextrin subform with a specific sorbent.

6 Claims, 5 Drawing Sheets

PROCESS FOR ISOLATION AND PURIFICATION OF CYCLODEXTRINS

This is a continuation of application Ser. No. 06/932,721, filed Nov. 19, 1986 now abandoned.

FIELD OF INVENTION

Cyclodextrins (cyclic glucose oligomers) are commercially important products obtained by an enzymatic process from solubilized starch. This invention comprises specific chromatographic methods for the isolation and purification of any of the individual cyclodextrin forms from aqueous mixtures containing acyclic oligosaccharides and cyclodextrins. In addition these methods are applicable to purification of chemical derivatives of CDs. The invention utilizes solid supports carrying appropriate, synthetically introduced, ligands capable of interacting specifically with one or more of the cyclodextrin forms in the enzymic conversion mixture.

Because the enzyme producing cyclodextrins catalyzes equilibrium between substrates and cyclodextrins of various sizes, mainly one cyclodextrin species can be produced by continuously and specifically removing the desired end-product from the mixture by using a proper affinity sorbent.

The present invention provides a one-step method to produce isothermically cyclodextrins or their chemical derivatives, both of analytical quality.

BACKGROUND OF THE INVENTION

Cyclodextrins (CDs) are generated through the action of cyclodextrin glucanotransferase (EC 2.4.1.19) (CGTase) on solubilized starch or related substrates containing 1 to 4-alpha glycosidic bonds. CDs are increasingly being utilized in several fields of science and technology to change inherent properties of a number of compounds such as vitamins, medicines, sanitary and agricultural effector-substances and aroma-compounds. Recently, similar applications have also been discovered for artificial, chemically modified cyclodextrins. The basis for the use of CDs lies in their ability to form molecular complexes or microcapsules with the effector compounds and thus to alter their physical and chemical properties such as solubility, volatility and absorption from the intestine.

The enzymatic reaction of CGTase predominantly yields a mixture of three forms of CDs, termed alpha, beta and gamma CDs. With many CGTases the beta form dominates in the conversion mixture. Because of its high concentration and low solubility in cold water, beta CD can be cheaply Produced in a pure crystalline state. Unfortunately, this is not the case with the less common forms of CDs. There is especially a need for pure, and considerably cheaper gamma CD than that presently available, because some important drugs would benefit from microencapsulation in CDs. These pharmaceuticals are, however, too large in molecular size to be imbibed into the internal cavity of other than gamma CD.

To produce gamma CD, processes have been devised, which use organic solvents such as trichloroethylene, tetrachloroethane or bromobenzene specifically to precipitate it, but these methods cannot be used when the product is intended for food or pharmaceutical use as it will frequently contain traces of the poisonous solvents.

Normally, 20–60% of the starch is converted to CDs depending on the concentration of starch being employed. When isolating beta CD, acyclic oligosaccharides must be converted to glucose or removed before the crystallization of beta CD is possible. However, usually when pure alpha or gamma CDs are desired the sugar fraction must be removed, its conversion to glucose is not adequate.

Separation of the alpha or gamma CDs out of CD mixtures is the most difficult step in their preparation. Two basically different approaches of the prior art using aqueous solvents are known. In the one method, CDs are separated by exclusion chromatography on gels such as Toyopearl ®, Molselect ®, or Sephadex ® (Eur. pat. specification 45464; Die Stärke 30 (1978) 276–279; Proceedings of the 1st Int. Symp. on Cyclodextrins, Budapest 1981, Ed. J. Szeijtli, pp. 61–68). This approach requires large columns, controlled temperature, and preliminary removal of small-molecular sugars and acyclic dextrins. The other approach is based on the ability of some commercially available, synthetic adsorption resins to adsorb CDs, provided the temperature of the column is strictly controlled. The earliest investigation was made by Yamamoto and Horikoshi (Die Stärke 33, (1981) 244–246). Amberlite ® XAD-4 adsorption resin was used, and the system was designed to purify alpha CD. The same principle for production also of gamma CD was later patented by Horikoshi et al. in 1984 (Eur.pat.specification 45464). Disadvantages of this method are that a stepwise temperature program is necessary, and that high temperatures (85°–97° C.) in the lengthy elution possibly give rise to chemical reactions. Additionally we have experimental evidence that CDs are adsorbed irreversibly onto the resins resulting in lowered adsorption capacity of the resin.

Adsorption chromatographic separation of glucose, maltose, and alpha and beta CDs on charcoal has also been reported (J. Lammers, J. Chromatogr. 41, 1969, pp. 462–466) but the support has low capacity for preparative purification of CDs.

The present invention includes an improved method of purifying individual CDs, especially gamma CD. Specific sorbents are synthesized for this purpose. The support matrix is primarily hydrophilic, which improves the swelling of the sorbents in water and increases the diffusional rates of CDs inside the porous network.

SUMMARY OF THE INVENTION

The present invention provides a simple and efficient technique for isolating and purifying alpha, beta, and especially gamma CDs, and also their chemical derivatives.

The second object is to use specific sorbents to direct the enzymatic conversion reaction toward one CD species by adsorbing the desired species on the sorbent.

Figure 1:
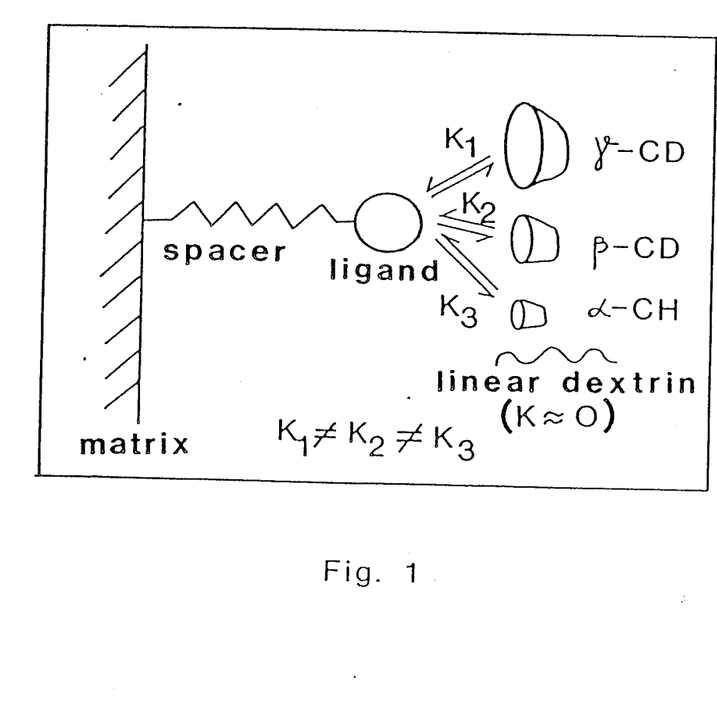
FIG. 1. Principle of the specific sorption of CDs on a derivatized support.

The above objects are accomplished by chemically combining various complexing agents (ligands) onto solid supports in order to obtain specific affinity sorbents for each of the CD species or for their chemically synthesized derivatives. FIG. 1 shows schematically the principle of the present invention. The ligand can form inclusion complexes with CDs. The complex formation efficiency varies with different CD forms, and each CD is therefore eluted from a chromatographic column according to its particular equilibrium constant (K). The principle of specific inclusion complex formation is characterized by removal of attached CDs from the sorbent by using soluble ligands or of other compounds known to complex relatively strongly with the CDs.

Several support materials with various attached ligands were tested. Porous hydrophilic matrices and ligands which contained polar groups or which were attached through polar functional groups to the matrix were the most effective in separating CDs from each other and from acyclic dextrins. Alpha CD is preferably separated by ligands with a relatively short ($C_4$-$C_7$) alkyl chain, or a longer alkyl chain containing polar groups such as —$NH_2$, —$CONH_2$, —OH, —$R^1$—NH—$R^2$, —CN, $R^1$—CH(OH)—$R^2$ ($R^1$ and $R^2$ denote alkyl groups). Long alkyl chains retain alpha CD irreversibly at room temperature. Beta CD is retarded by ligands such as phenyl attached through a polar bond, substituted phenyl (—$NH_2$, —$OCH_3$, —COOH, —$CONH_2$, —$NH(R)_2$, —$NO_2$, or —CN), tryptophanyl, substituted imidazolyl, or larger aromatic ring systems such as napthyl attached through positions 2 or 3 and preferably containing polar substituents. Gamma CD interacts most specifically with gels containing substituted napthylic ligands preferably bound through positions 1 or 8. These specific supports improve the purification of CDs in comparison to the earlier methods. The isolation and purification of alpha, beta and gamma CDs or their derivatives can be performed isothermically, in aqueous solutions, and in high dextrin concentrations (up to 35% dry weight) without a preliminary conversion of acyclic sugars to glucose and by carrying out the chromatographic step isocratically. By means of this invention it is possible to produce pure cyclodextrins directly from conversion mixtures or from mixtures having the beta CD already removed.

DETAILED DESCRIPTION OF THE INVENTION

This invention yields specific sorbents for each form of CD. Table 1 shows the separation of alpha, beta and gamma CDs on various synthesized affinity sorbents.

Specific sorbents were also developed for chemically derivatized CDs.

The following factors affect the specificity of interaction of different sorbents with different CD subforms:

When nonrigid supports of the gel type are used, their porosity must considerably exceed the exclusion limit for CDs because of partial gel shrinkage during derivatization.

The ligands should be coupled via polar bonds to make them soluble in the aqueous phase.

The preferred ligand for gamma CD is of a size which allows penetration of the internal cavity of gamma CD, but one larger than the cavity of alpha or beta CD. Correspondingly, the preferable ligand for beta CD does not fit the cavity of alpha CD, while being relatively loose in the cavity of gamma CD.

The strength of interaction of the ligand free in the solution cannot be straightforwardly utilized to design specific sorbents for CDs otherwise than to estimate the maximum molecular dimensions of the ligand. This is because the mode of complexation to CDs is not necessarily equal in solution and in solid phase. In addition, the ligand is chemically coupled to the supports through at least one of its functional groups. As an example in solution a benzyl group usually interacts most strongly with alpha CD (Korpela et al., J. Chromatogr. 290 (1984) pp. 351-361), but when immobilized the group interacts predominantly with beta CD (Table 1). This is apparently due to a mutual interaction of the attached ligands in the solid phase. However, if the ligands are forced apart by spacer groups (dimethylbenzaldehyde derivative of PBE® 94 gel as in Table 1), a specificity similar to that in solution is achieved. Solution conditions are also approached by using a very low degree of ligand substitution.

In solution the degree of complex formation usually increases when the temperature decreases (Korpela et al., J. Chromatogr. 290 (1984) pp. 351-361). This situation is not necessarily valid in solid phase, because the favorable effect of temperature may be counteracted by increased ligand-gel or ligand-ligand interaction.

Various support materials differ in their effective surface areas and ligand binding. This affects the capacity of the sorbent but does not qualitatively influence the separation profile concerning CDs.

Sorbents which give different elution volumes for individual CDs do not necessarily separate their mixtures. This can be surmised to be caused by complex interference of the binding mechanisms.

Very hydrophobic ligands do not bind CDs, or do so weakly and at a slow binding rate (indicated by broad bands in chromatography); the binding may also be irreversible. The phenomenon is even more apparent on hydrophobic matrices.

TABLE 1

Separation of alpha, beta and gamma cyclodextrins on various synthesized affinity sorbents.

| Support | Example | Reagent | Bond | Retention of Cyclodextrins |
|---|---|---|---|---|
| CELLULOSE | 2 | 1-propylamine | —NH— | $\alpha = \beta = \gamma$ |
| | 2 | 1-pentylamine | —NH— | $\alpha > \beta = \gamma$ |
| | 2 | 1-hexylamine | —NH— | $\alpha > \beta > \gamma$ |
| | 2 | 1-dodecylamine | —NH— | $\alpha >> \beta > \gamma$ |
| | 2 | benzylamine | —NH— | $\beta > \alpha = \gamma$ |
| | 2 | 1-(aminomethyl) napthalene | —NH— | $\alpha = \beta = \gamma$ |
| | 3 | benzoylchloride | —NHCO— | $\alpha = \beta = \gamma$ |
| | 2,12 | 2-hydroxy-3-napthoic acid | —NHCO | $\alpha = \beta = \gamma$ |

TABLE 1-continued

Separation of alpha, beta and gamma cyclodextrins on various synthesized affinity sorbents.

| Support | Example | Reagent | Bond | Retention of Cyclodextrins |
|---|---|---|---|---|
| | 2,15 | 1,8-napthylic acid anhydride | —NHCO | $\gamma > \beta > \alpha$ |
| | 2,12 | 2-napthoxy acetic acid | —NHCO | $\beta > \alpha = \gamma$ |
| SEPHAROSE ® | 4 | octylamine | isourea | $\alpha >> \beta > \gamma$ |
| | 5 | benzylamine | isourea | $\alpha = \beta = \gamma$ |
| | 7 | DL-tyrosine | —CH$_2$NH— | $\beta > \alpha > \gamma$ |
| | 7 | DL-phenylalanine | —CH$_2$NH— | $\beta > \alpha > \gamma$ |
| | 7 | DL-tryptophan | —CH$_2$NH— | $\beta >> \alpha > \gamma$ |
| | 7 | 6-(p-toluidino)-2-napthalenesultonic acid | —CH$_2$—N | $\beta > \alpha > \gamma$ |
| | 7 | 1-(aminomethyl) napthalene | —CH$_2$NH— | $\alpha = \beta = \gamma$ |
| PBE ®94 | 8 | 2,4-fluorodinitrobenzene | —NH—Phe | $\alpha > \beta = \gamma$ |
| | 8,11 | 2,4-dimethoxybenzaldehyde | —NHCH$_2$— | $\alpha > \beta > \gamma$ |
| Amberlite ® IRA ®-45 | 8 | 2,4-fluorodinitrobenzene | —NH—Phe | $\alpha = \beta = \gamma$ |
| Amberlite ® IRA ®-93 | 8 | 2,4-fluorodinitrobenzene | —NH—Phe | $\gamma > \beta > \alpha$ |
| POROUS GLASS | 9 | benzylamine | —CH$_2$NHCH$_2$— | $\beta > \gamma > \alpha$ |
| BIOGEL ®P-611 | | 2,4-dimethoxybenzaldehyde | —NHCH$_2$— | $\alpha > \beta > \gamma$ |
| | 12 | benzoic acid | —NHCO— | $\beta > \alpha > \gamma$ |
| | 10,3 | benzoylchloride | —NHCO— | $\beta >> \alpha > \gamma$ |
| | 12 | adamantyl-1-carboxylic acid | —NHCO— | $\beta >> \gamma > \alpha$ |
| | 12 | linoleic acid | —NHCO— | $\alpha = \beta > \gamma$ |
| | 12 | DL-tyrosine | —NHCO— | $\beta > \alpha = \gamma$ |
| | 12 | DL-phenylalanine | —NHCO— | $\alpha = \beta = \gamma$ |
| | 12 | DL-tryptophane | —NHCO— | $\alpha > \beta > \gamma$ |
| | 13 | 2,4,6-trinitrobenzene-sulphonate | —NH—Phe | $\alpha = \beta = \gamma$ |
| | 14 | 2-napthoxy acetic acid | —NHCO— | $\beta > \gamma >> \alpha$ |
| | 14 | 2-hydroxy-3-napthylic acid | —NHCO— | $\beta >> \alpha = \gamma$ |
| | 15 | 1,8-napthylic acid anhydride | —NHCO— | $\gamma >> \beta > \alpha$ |
| SEPHACRYL ® S 200 | 15 | 1,8-napthylic acid anhydride | —NHCO— | $\gamma >> \beta > \alpha$ |

Porous materials with exclusion limits in the order of 1000–10000 and with relatively polar ligands have the highest capacity.

The strength of interaction of CDs with the specific sorbents and the swelling of the sorbents can be regulated with the pH, ionic strength and temperature of the mobile phase.

Specific sorbents can be used to increase the yield of various CDs and their chemical derivatives by specifically removing the synthesis product from the synthesis mixture:

The sorbents prepared according to this invention are appropriate for changing the equilibrium catalyzed by the enzyme CGTase toward a desired CD species. This is preferably accomplised in a series of columns containing immobilized CGTase and specific sorbent. The column is fed with a solution containing small-molecular substrates of CGTase. Although the immobilized CGTase is not particularly effective in the case of macromolecular substrate (e.g. gelatinized starch) it can be replaced by cheap small-molecular substrates such as beta-CD or oligosaccharides containing 3-15 glucose units which have minor diffusional limitations. Alternatively, CDs can be brought into contact with the specific sorbents through a dialysis membrane.

Illustrative examples of the synthesis of specific sorbents and of the purification of different CD-forms by using these specific sorbents are presented in the following:

EXAMPLE 1

Triazine derivative of cellulose

Principle of the synthesis:

Ten grams of cellulose powder MN 300 (Sigma) was suspended in water and swelled overnight at room temperature. The swelled material was washed with 50 ml of cold (0°–5° C.) 2M NaOH on a glass filter and then with 100 ml of cold (−20° C.) acetone. The powder was filtered and immediately transferred to a vial containing 3 g cyanuric chloride (2,4,6-trichloro-1,3,5-triazine, Aldrich) in cold (−20° C.) acetone. The suspension was continuously stirred and 50 ml of ice-cold water was added. The solution was allowed to warm up to 20° C. within about 10 minutes (the pH should be then 1-2). The derivative was washed on a glass filter with ice-cold acetic acid (20% in water) and acetone (200 ml each). Storage in acetone at −20° C.

EXAMPLE 2

Aminated cellulose

Principle of the synthesis:

250 ml of a 0.5M solution of bis-(aminopropyl) amine was prepared and its pH adjusted to 10 with HCl. If all the amine was not dissolved, a minimum amount of dimethylsulphoxide was added dropwise. The solution was cooled in an ice-bath and 100 g of moist triazine-cellulose was added. The suspension was stirred in an ice-bath and the pH was maintained at 10 by using 5M NaOH. When the consumption of the base ceased, the aminated cellulose was washed in turn with water, 0.5M NaOH, water, ethanol, acetone and water (500 ml each). Storage in water at 0° C.

Other amino derivatives of cellulose were prepared in the same way but bis-(aminopropyl)amine was replaced with an equal molar concentration of the amino compounds.

EXAMPLE 3

Benzoylated amino cellulose

Ten grams of filtered moist aminated cellulose (Example 2) was mixed with water and cooled in an ice bath. The suspension was stirred, and the pH was brought to 11 with 5M NaOH. Four milliliters of benzoylchloride was added dropwise during 30 minutes with the pH kept at 1.1. After that the temperature was allowed to rise, in about 1 h, to room temperature. Gentle stirring was further continued for about 4 h. The suspension was filtered, and the solid was washed in turn with water, ethanol, water, 1M NaCl, and water (0.5 l each). Storage in water at 0° C.

EXAMPLE 4

Octyl-Sepharose CL 4B was synthesized as described in Affinity Chromatography: a Practical Approach Eds. by P. D. G. Dean, W. S. Johnson and F. A. Middle; RL Press Ltd., Oxford, Washington, D.C. (1985), 215 p.

EXAMPLE 5

Phenyl-Sepharose CL 4B was synthetized as described in Affinity Chromatography (1985) Ed. by Dean et al.

EXAMPLE 6

Epoxy activated Sepharose 4B

Sepharose CL 4 B (200 ml; Pharmacia) was washed with water in a funnel and the moist gel was suspended in 140 ml of 0.6M NaOH containing 280 mg NaBH$_4$. Dimethylsulphoxide (20 ml) was added followed by 42 ml of 1,4-butanediol-diglycidylether (Sigma). The reaction was allowed to proceed for 6 h at room temperature with stirring whereafter the gel was washed with water (2 l). The gel could be stored at +5° C. for about one week.

EXAMPLE 7

Attachment of amino ligands to epoxy-activated Sepharose

Ten grams of moist, suction dried, epoxy-activated Sepharose CL 4 B was suspended in 20 ml of 0.1M NaHCO$_3$, pH 10.5, containing 0.5 g of the amino ligand (e.g. tyrosine, tryptophan, phenylalanine, 1-aminonaphtalene) or 6-(p-toluidino)-2-naphtalene sulphonic acid). The mixture was stirred overnight at room temperature. The gel was washed with water (100 ml) and Tris-HCl buffer (0.1M, pH 9.0; 100 ml) and left to stand in the same buffer overnight. The washing was continued in turn with water, 50% ethanol, 100% ethanol, 50% ethanol, 0.1M Na-acetate, pH 3.0, and water (100 ml each).

EXAMPLE 8

Coupling of 2,4-fluorodinitrobenzene to PBE 94

Twenty grams of moist, suction dried PBE 94 chromatofocusing gel (Pharmacia, Sweden) was washed with 100 ml of 0.1M Na-phosphate buffer, pH 7.0, in a funnel. The gel contains aminopolyelectrolytes bound to Sepharose. The gel was suspended in the above-mentioned buffer (30 ml) at room temperature. Fifty millimoles of 2,4-fluorodinitrobenzene was dissolved in 5 ml of methanol, and this solution was slowly added (within 30 min) to the stirred gel suspension, with the pH held at 7 with 1M NaOH. The stirring was continued and the pH was maintained at 7 until it remained constant for at least 10 minutes. The gel was washed in turn with water, 50% ethanol, 100% ethanol, 50% ethanol, water, 0.5M NaCl and water (200 ml each).

Coupling of 2,4-fluorodinitrobenzene to Amberlite IRA-45 and Amberlite IRA-93 resins was done as with the PBE 94 derivative.

EXAMPLE 9

Benzyl derivative of porous glass

Porous glass (Sigma, PG-240-400) was epoxy-activated as described by Larsen in Methods in Enzymology 104 (1984) p. 212. Five grams of the activated glass, 5 ml of dimethylsulphoxide, and 10 ml of benzylamine were gently shaken at room temperature overnight. The support was washed in turn with water (0.5 l), ethanol (100 ml) and ether (50 ml) and stored in a dry state.

EXAMPLE 10

Preparation of aminoethyl Biogel P-6

Principle:

Biogel-CONH$_2$+H$_2$N
CH$_2$CH$_2$NH$_2$→Biogel-NHCH$_2$CH$_2$NH$_2$+NH$_3$

Twenty five grams of Biogel P-6, 200–400 mesh (Bio-Rad Laboratories) was added to 500 ml of ethylene diamine (technical grade, E. Merck) in a round-bottomed bottle equipped with a reflux condenser and a magnetic stirrer. The suspension was kept at 110–115° C. (oil bath) with continuous stirring for 4 h. The mixture was allowed to cool to room temperature, filtered, and washed in turn with water, 0.2M NaCl, water, 10% ethanol and water (2 l each). The pH of the aqueous gel suspension (1 l) was then adjusted to 3.0 with 5M HCl and the washing was continued with 10% ethanol (2 l), 50% ethanol (0.5 l), ethanol (0.5 l), 50% ethanol (0.5 l) and water (2 l). Storage as an aqueous suspension at +5° C.

Preparation of aminoethyl Sephacryl S 200 was done similarly to that of the aminated Biogel P-6, except that the refluxing was carried out at 100° C.

EXAMPLE 11

Coupling of 2,4-dimethoxybenzaldehyde to aminoethyl Biogel P-6

The aminated Biogel P-6 (12 g of moist gel) was suspended in 20 ml of water. The pH of the suspension was adjusted to 11 with 5M NaOH. The gel was washed with water (50 ml) and then with methanol (100 ml). It was thereafter suspended in methanol (30 ml) and 20 millimoles of 2,4-dimethoxybenzaldehyde (Aldrich) was added. The suspension was gently shaken overnight at room temperature. Five millimoles of solid NaBH$_4$ was added and the shaking was continued overnight at +5° C. Care should be taken not to stopper the bottle totally because H$_2$ gas is evolved. The gel was washed in turn with water, 0.5M NaCl, water, 50% ethanol, ethanol, 50ethanol, and water (100 ml each).

EXAMPLE 12

Preparation of benzoylated amino Biogel P-6

Benzoic acid (1 g) was dissolved in 30 ml of warm water, and the pH was adjusted to 4.7 with 1M NaOH. If all the benzoic acid did not dissolve, a minimum amount of methanol was added to bring it into solution. Thirty grams of suction-dried, moist, aminated Biogel P-6 was added to the solution and the pH was readjusted to 4.7 (HCl or NaOH). N-Ethyl-N'-(3-dimethylaminopropyl) carbodiimide hydrochloride (1.5 g, Sigma) was dissolved in 5 ml of water at 0° C. The solution was added dropwise to the gel suspension at room temperature with continuous stirring during 30 min. Gentle stirring was continued for 4–8 hours. The gel was then filtered off and washed in a funnel successively with water, 50% ethanol, methanol, 50% ethanol, water, 0.2M NaCl, and water (1 l each).

In essentially the same way other carboxylic ligands (adamantyl-1-carboxylic acid, tyrosine, tryptophane, phenylalanine and linoleic acid) were bound to aminated Biogel P-6 via carboxylic function.

EXAMPLE 13

Trinitrobenzene derivative of aminated Biogel P-6

Twenty grams of moist aminated Biogel P-6 was washed with 100 ml of 0.1M Na-tetraborate buffer, pH 9.3. The gel was suspended in 20 ml of the same buffer. 2,4,6-Trinitrobenzene sulphonate (0.6 g) was added, and the mixture was stirred at room temperature for 4 h, maintaining the pH at 9.3 with 1M NaOH. The deep-red gel was thoroughly washed in turn with water, 0.5M NaCl, water, 50% ethanol, ethanol, 50% ethanol and water (200 ml each).

EXAMPLE 14

2-Naphtoxy acetic acid derivative of aminated Biogel P-6

Five grams of 2-naphtoxy acetic acid was dissolved in aqueous 20 % dimethylsulphoxide. Fifty milliliters (a settled volume) of aminated Biogel P-6 was added, and the pH was adjusted to 4.7 with 1M NaOH. The suspension was continuously stirred at 20° C. while N-ethyl-N'-(3-dimethylaminopropyl) carbodiimide hydrochloride (4 g in 20 ml of water at 0° C.; Sigma) was added dropwise during 30 min, and the pH was maintained at 4.7. Gentle stirring was continued for 4–8 h. The gel was washed in turn with water, 50% ethanol, ethanol, 50% ethanol, water, 0.5M NaCl and water (500 ml each).

The 2-hydroxy-3-napthylic acid derivative of aminated Biogel P-6 was prepared similarly.

EXAMPLE 15

1,8-Naphtylic acid anhydride derivative of aminated Biogel P-6

Figure 2:
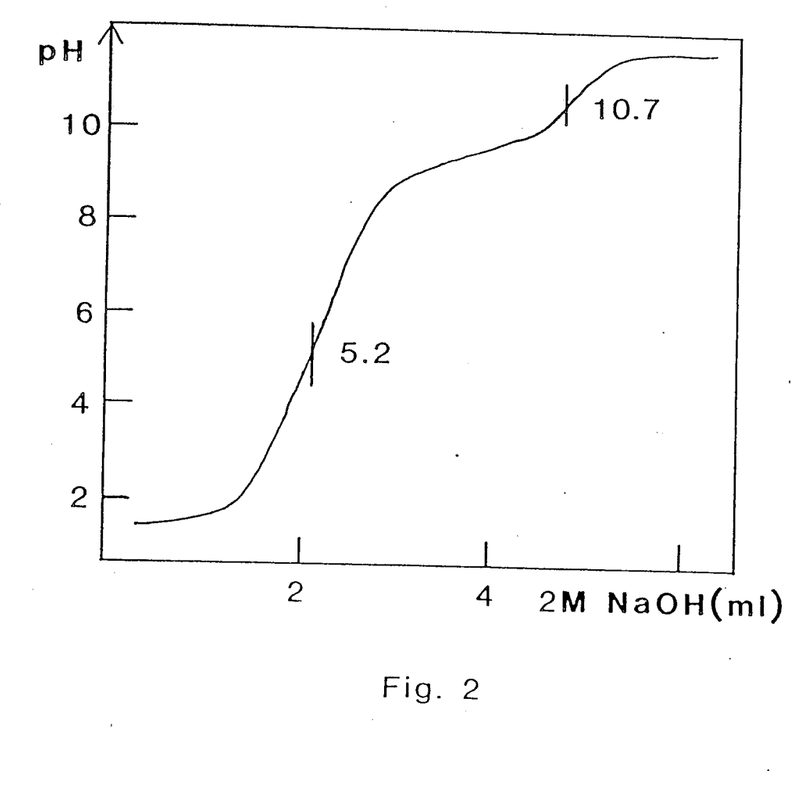
FIG. 2. Titration curve of 1,8-naphtylic dianhydride derivative of aminated Biogel® P-6.

Fifty milliliters (a settled volume) of aminated Biogel P-6 and 950 mg of 1,8-naphtylic acid anhydride (Aldrich) were suspended in 50 ml of water at room temperature. The mixture was vigorously stirred while the pH was raised to 11.0 (pH meter) with 5M NaOH. The temperature was increased to 40° C., gentle stirring was continued at 40° C. for 6 h, and the pH was kept at 11.0±0.2 with 1M NaOH. Then the gel was washed in turn with water, 50% ethanol, ethanol, 50% ethanol, water, 0.5M NaCl and water (500 ml each). After this process the settled volume of the gel was 22–25 ml. The titration curve of 14 ml of this gel is shown in FIG. 2.

The aminated Biogel P-6 was similarly derivatized with phtalic anhydride and pyromellitic acid dianhydride.

EXAMPLE 16

Succinic acid derivative of 1,8-naphtylic acid anhydride for aminated Biogel P-6

Twenty milliliters of 1,8-napthylic acid derivative of Biogel P-6 (example 15 above) treated with 2 g of succinic acid anhydride to block the free amino groups in the gel. This was done in saturated sodium borate solution at room temperature with continuous stirring, keeping the pH of the solution at 8–9 with 2M NaOH. The gel was washed in the same way as the gel in Example 15.

EXAMPLE 17

Purification of gamma CD

The enzyme CGTase was produced by an alkalophilic Bacillus sp. as described by Matzuzawa et al. (Die Stärke, 27 (1975) 410). The conversion mixture was prepared according to conventional techniques (Nakamura & Horikoshi. Biotechnology and Bioengineering 19 (1977) 87–99).

A partially purified conversion mixture containing 140 g linear sugars, 20 g alpha CD, 21 g beta CD, and 8 g gamma CD in one liter of aqueous solution was applied to a column of 1,8-naphtylic acid anhydride derivatized Biogel P-6 (example 15 in Table 1). The adsorbent (170 ml) was packed to a glass column (i.d.

2.2 cm) and was equilibrated with 200 ml of 25 mM NaHCO$_3$, pH 10.5. The sample (50 ml) was fed into the column and the elution carried out at a flow rate of 80 ml/h at (22° C.). Elution at pH 3.0 (25 mM glycine buffer) results in an equally effective separation.

Figure 3:
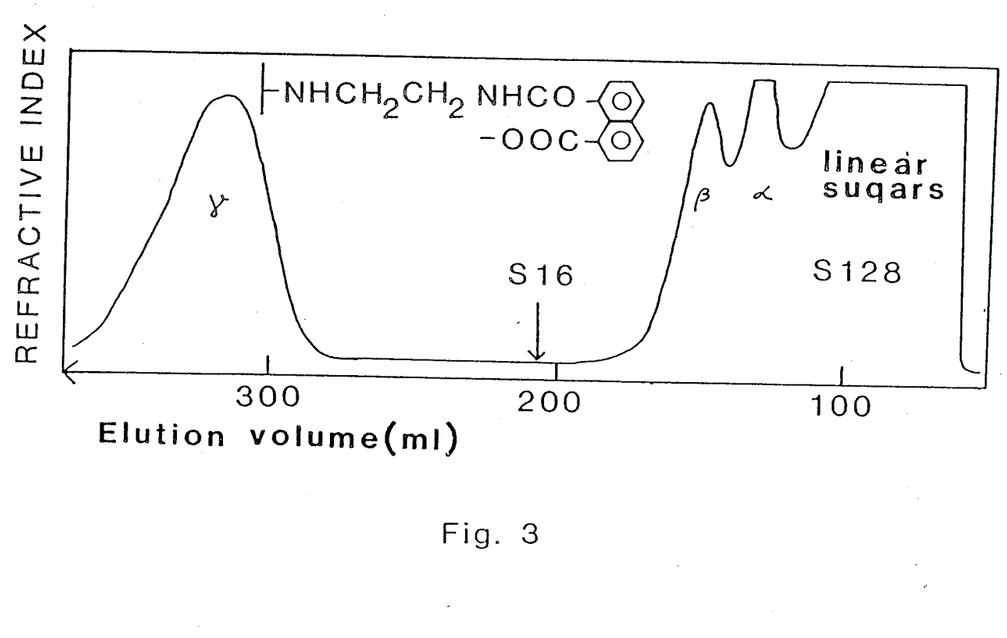
FIG. 3. Separation of gamma CD on 1,8-naphtylic dianhydride derivative of aminated Biogel® P-6.

The gamma CD fractions between 270-350 ml were collected (see FIG. 3), treated with Dowex® 50 X8 (200-400 mesh) in H+-form to remove the buffer, with active charcoal, and finally evaporated to dryness in a rotary evaporator. The yield was 80-85% (compared to the sample fed into the column), and the purity was 100±2% as measured with HPLC against gamma CD from Sigma.

EXAMPLE 18

Purification of gamma CD.

The system was also applicable to more concentrated solutions which in addition contained a high concentration of gamma CD. 6 ml of a partially purified conversion mixture containing 321 g sugars per liter (4.0% alpha CD, 10.4% beta CD, 28.5% gamma CD, 43.0% linear sugars below DP8, and 14.1% other carbohydrates) was fed into a column (i.d. 1.3 cm, volume 27 ml) filled with the same sorbent as above. Elution was carried out with 25 mM NaHCO$_3$, pH 10.5, at a flow rate of 15 ml/h. The gamma fraction (between 45-75 ml; the concentration of gamma-form was 18 g/l) was collected and clarified as above. The yield and the purity of the product was 90-94% and 96-97%, respectively. The calculated capacity of the gel for the gamma form was 20.4 g/l.

We have repeated the separation process 35 times under the same conditions and no change in separation capacity or in the physical properties of the gel was observed.

If the elution was carried out in pH 3 with 10$^{-3}$M HCl solution, slight shrinkage of the gel matrix occurred after several (10) repeated runs.

EXAMPLE 19

Purification of beta CD

Figure 4:
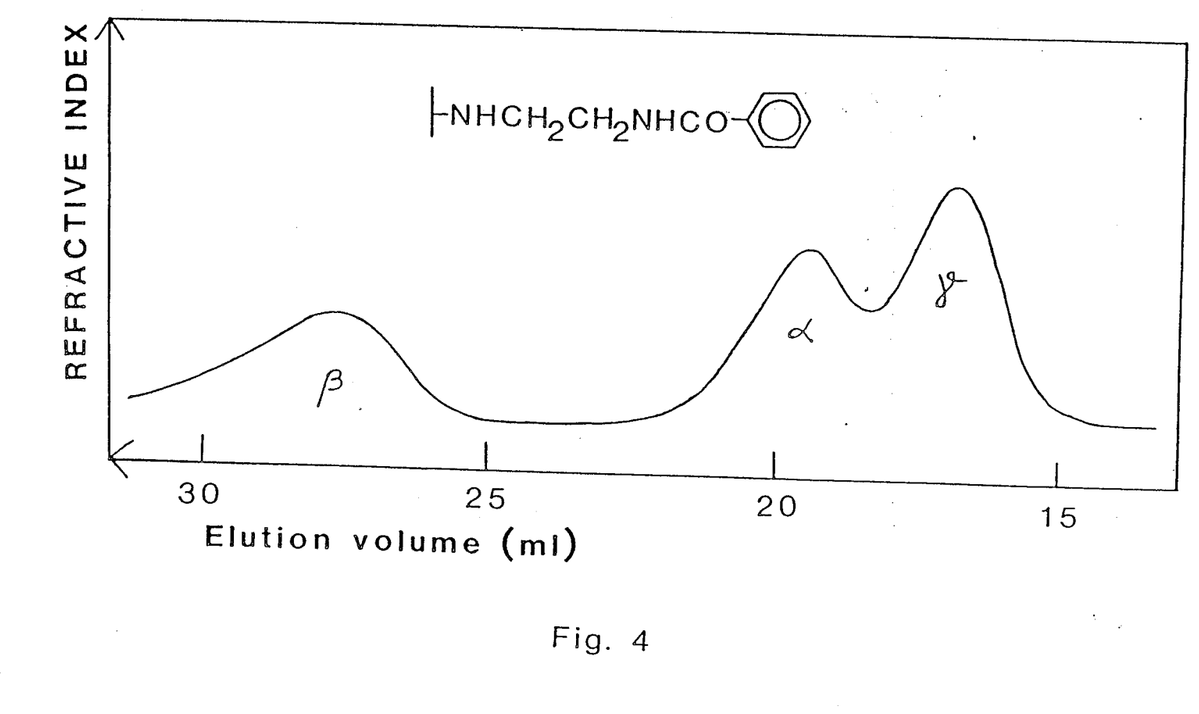
FIG. 4. Separation of a mixture of alpha, beta and gamma CDs on a column of benzoylated amino-Biogel® P-2.

A 0.125 ml sample containing 4 mM alpha, beta and gamma CDs each was fed into a column (15 ml) containing benzoic acid derivative of Biogel P-6 (example 12). The elution was performed at room temperature with water (flow-rate 6 ml/h). The beta CD fractions (see FIG. 4) were collected and evaporated to dryness (yield 95%, purity 100±2%).

EXAMPLE 20

Purification of alpha-CD

The same system as in example 19 was used, except that hexylamine-derivatized cellulose (example 2) was employed. Yield 88%, purity 100±2%.

EXAMPLE 21

Purification of di- and tri-methylated derivatives of beta-CD

Figure 5:
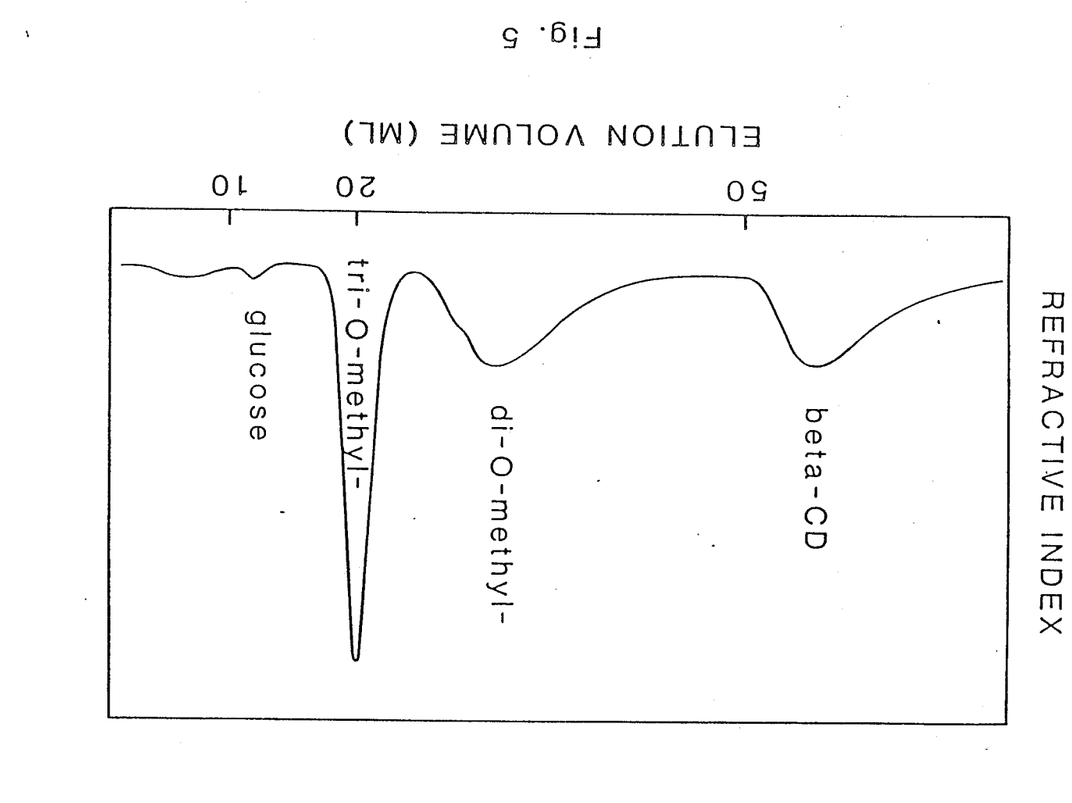
FIG. 5. Separation of beta CD and its di- and trimethylated derivatives on benzoylated amino-Biogel® P-6.

The chromatography was performed on benzoylated Biogel P-6 (example 10; gel volume 27 ml). The mobile phase was distilled water, and the sample solution contained beta CD, heptakis (2,6-di-O-methyl)-beta CD and heptakis (2,3,6-tri-O-methyl)-beta CD (0.5 mg each). FIG. 5 shows that the compounds were completely separated.

EXAMPLE 22

Production of gamma CD from beta CD

The enzyme CGtase was immobilized on CNBr-activated Sepharose 4B according to the manufacturer's instructions (Pharmacia Fine Chemicals) using 15 mg of protein per 3 g of dry gel. Immobilized CGTase was packed into a glass column (i.d. 0.5 cm, volume 7.5 ml), and the column was eluted with 10 mM beta CD solution in water at a flow rate of 0.45 ml/min at room temperature. The eluate contained 0.91 mM alpha CD, 7.32 mM beta CD, 1.52 mM gamma CD and traces of various linear sugars.

The above mentioned eluate (50 ml) was chromatographed on succinylated 1,8-naphtylic acid anhydride gel (example 16) in a column containing 170 ml of the gel. The elution was carried out with distilled water at SV=0.5. Gamma CD fractions were collected and purified as described in example 17. The yield was 92-95%, and the purity of the product 96-98%. The other sugar-containing fractions were combined and new beta CD was added in order to restore the original sugar content (12% w/v) of the solution, and then the overall process was repeated.

Examples 1 to 16 describe the syntheses of specific sorbents. In these syntheses ligands were introduced into commercially available materials. Alternatively the matrix itself could be synthesized. This approach will provide cheap sorbents whith high capacity.

Examples 17 to 21 describe the purification of alpha CDs, beta CDs (and its derivatives) and gamma CDs. The purification could of course be performed with many other sorbents by means of this invention. The best mode to do so is described in these examples.

Example 22 illustrates an other application in which the sorbents, designed according to the present invention can be used to increase the yield of one CD form in the synthesis mixture.

We claim:

1. A process for isolation and purification of cyclodextrin or its synthetic derivatives, comprising the steps of contacting a mixture containing a material selected from the group consisting of cyclodextrins and synthetic derivatives thereof with an adsorbent containing covalently bound ligands capable of penetrating the internal cavity of the molecules of said material to form an inclusion complex with said material, and eluting said complex from the mixture with an aqueous solution, said material including alpha cyclodextrin and said ligands being selected from an alkyl chain containing from 4 to 7 atoms and an alkyl chain containing polar groups selected from the group consisting of —NH$_3$, —CONH$_2$, —OH, —R$^1$—NH—R$^2$, —CN, R$^1$—CH-(OH)—R$^2$, where R$^1$ and R$^2$ denote alkyl groups.

2. A process for isolation and purification of cyclodextrin or its synthetic derivatives, comprising the steps of contacting a mixture containing a material selected from the group consisting of cyclodextrins and synthetic derivatives thereof with an adsorbent containing covalently bound ligands capable of penetrating the internal cavity of the molecules of said material to form an inclusion complex with said material, and eluting said complex from the mixture with an aqueous solution, said material including beta cyclodextrin and said ligands being selected from the group consisting of phenyl attached through a polar bond, substituted phenyl (—NH$_2$, —OCH$_3$, —COOH, —CONH$_2$, —NH(R)$_2$, —NO$_2$, or —CN), tryptophanyl-, substituted imidazoyl, or with larger aromatic ring systems such as napthyl attached through positions 2 or 3 and containing polar substituents.

3. A process for isolation and purification of cyclodextrin or its synthetic derivatives, comprising the steps of contacting a mixture containing a material selected from the groups consisting of cyclodextrins and synthetic derivatives thereof with an adsorbent containing covalently bound ligands capable of penetrating the internal cavity of the molecules of said material to form an inclusion complex with said material, and eluting said complex from the mixture with an aqueous solution, said material including gamma cyclodextrin purified on gels derivatized by substituted napthylic ligands bound through positions 1 or 8.

4. A process for isolation and purification of cyclodextrin or its synthetic derivatives, comprising the steps of contacting a mixture containing a material selected from the group consisting of cyclodextrins and synthetic derivatives thereof with an absorbent containing covalently bound ligands capable of penetrating the internal cavity of the molecules of said material to form an inclusion complex with said material, and eluting said complex from the mixture with an aqueous solution, said material being alpha cyclodextrin and the absorbent being hexylamine-derivatized cellulose.

5. A process for isolation and purification of cyclodextrin or its synthetic derivatives, comprising the steps of contacting a mixture containing a material selected from the group consisting of cyclodextrins and synthetic derivatives thereof with an adsorbent containing covalently bound ligands capable of penetrating the internal cavity of the molecules of said material to form an inclusion complex with said material, and eluting said complex from the mixture with an aqueous solution, said material being beta cyclodextrin and said adsorbent being benzoic acid derivative of porous polyacrylamide.

6. A process for isolation and purification of cyclodextrin or its synthetic derivatives, comprising the steps of contacting a mixture containing a material selected from the group consisting of cyclodextrins and synthetic derivatives thereof with an adsorbent containing covalently bound ligands capable of penetrating the internal cavity of the molecules of said material to form an inclusion complex with said material, and eluting said complex from the mixture with an aqueous solution, said material being gamma cyclodextrin and said adsorbent being 1,8 napthylic acid anhydride derivatized porous polyacrylamide.

* * * * *

UNITED STATES PATENT AND TRADEMARK OFFICE
CERTIFICATE OF CORRECTION

PATENT NO. : 4,897,472

DATED : January 30, 1990

INVENTOR(S) : TIMO KORPELE ET AL

It is certified that error appears in the above-identified patent and that said Letters Patent is hereby corrected as shown below: ON TITLE PAGE:

At "[73] Assignee:" Cancel "Norway" and substitute therefor ---Finland---; Col. 12, Line 52, CLAIM 1, After "7" insert ---carbon---; Col. 13, line 23 CLAIM 4, Delete "absorbent" and substitute therefor ---adsorbent---; Col. 14, Line 2, CLAIM 4, Delete "absorbent" and substitute therefor ---adsorbent---

Signed and Sealed this

Twenty-second Day of October, 1991

Attest:

HARRY F. MANBECK, JR.

Attesting Officer

Commissioner of Patents and Trademarks